US009583969B2

(12) United States Patent
Takano

(10) Patent No.: US 9,583,969 B2
(45) Date of Patent: Feb. 28, 2017

(54) ELECTRONIC DEVICE, COMPUTER-READABLE STORAGE MEDIUM, AND PORTABLE TERMINAL

(71) Applicant: CASIO COMPUTER CO., LTD., Shibuya-ku, Tokyo (JP)

(72) Inventor: Satoru Takano, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 286 days.

(21) Appl. No.: 14/560,841

(22) Filed: Dec. 4, 2014

(65) Prior Publication Data
US 2015/0180270 A1 Jun. 25, 2015

(30) Foreign Application Priority Data
Dec. 19, 2013 (JP) ................................. 2013-261939

(51) Int. Cl.
| | |
|---|---|
| H02J 7/00 | (2006.01) |
| H02J 7/02 | (2016.01) |
| H01F 38/14 | (2006.01) |
| H04B 5/00 | (2006.01) |
| H02J 17/00 | (2006.01) |
| H02J 5/00 | (2016.01) |

(52) U.S. Cl.
CPC .............. *H02J 7/025* (2013.01); *H01F 38/14* (2013.01); *H02J 17/00* (2013.01); *H04B 5/0031* (2013.01); *H04B 5/0037* (2013.01); *H04B 5/0093* (2013.01); *H02J 5/005* (2013.01); *H02J 7/0042* (2013.01); *H02J 2007/0095* (2013.01); *H02J 2007/0096* (2013.01); *H02J 2007/0098* (2013.01)

(58) Field of Classification Search
CPC .... H02J 5/005; H02J 7/025; H02J 2007/0095; H02J 2007/0096; H02J 2007/0098
USPC .................. 320/107–108, 113–115; 455/41.1
See application file for complete search history.

(56) References Cited

U.S. PATENT DOCUMENTS

| | | | | |
|---|---|---|---|---|
| 2010/0279606 A1 | 11/2010 | Hillan et al. | | |
| 2014/0065948 A1* | 3/2014 | Huang | ................. | H05K 5/0086 455/7 |
| 2014/0145673 A1* | 5/2014 | Heilbrun | ............... | H02J 7/0042 320/107 |

FOREIGN PATENT DOCUMENTS

| | | |
|---|---|---|
| JP | 2012518338 A | 8/2012 |
| WO | 2010093969 A2 | 8/2010 |

* cited by examiner

*Primary Examiner* — Stacy Whitmore
(74) *Attorney, Agent, or Firm* — Holtz, Holtz & Volek PC

(57) ABSTRACT

An electronic device of the present invention has a secondary battery as a power source, and has a first interface arranged in one surface of the electronic device that includes a first communicating section which performs data communication with a first external device by near field communication and a power receiving section which is capable of receiving electric power from the first external device without being in direct contact and charging the secondary battery, and a second interface arranged in another surface of the electronic device that includes a second communicating section which performs data communication with a second external device by near field communication and a power transmitting section which is capable of transmitting electric power received from the secondary battery to the second external device without being in direct contact, and a control section which controls the operations of the first interface and the second interface.

12 Claims, 9 Drawing Sheets

ELECTRONIC DEVICE, COMPUTER-READABLE STORAGE MEDIUM, AND PORTABLE TERMINAL

CROSS-REFERENCE TO RELATED APPLICATION

This application is based upon and claims the benefit of priority from the prior Japanese Patent Application No. 2013-261939, filed Dec. 19, 2013, the entire contents of which are incorporated herein by reference.

BACKGROUND OF THE INVENTION

1. Field of the Invention

The present invention relates to an electronic device having a secondary battery as a power source, a computer-readable storage medium, and a portable terminal.

2. Description of the Related Art

Generally, electronic devices (such as cellular phones, smartphones, handheld gaming devices, music players, tablet computers, or handy terminals) that have a secondary battery as a power source are placed on or connected to a charging device called a cradle so as to perform data communication with an external device (such as a personal computer) while the secondary battery is being charged. As a technique where data communication can be performed at the time of charging, for example, a technique is known in which near field communication and wireless charging between an electronic device and a charging system can be performed with a simple structure (refer to Japanese Unexamined Patent Application (Kohyo—Translation of PCT application) Publication No. 2012-518338).

In the case of electronic devices dedicated for personal use, such as smartphones, electronic game machines, and music players, the user requires charging devices (cradles having a communication function) as many as the number of the electronic devices. However, in the case of handy terminals and computer tablets for business use, in many cases, one charging device (cradle) is installed for each group of a plurality of employees and shared. In this case where one charging device is shared among a plurality of persons in order to reduce the number of charging devices to be installed, if one electronic device is being charged or communicating (being used), the other electronic devices are in a charging wait state or a communication wait state until the charging or communication is completed. This problem applies not only to the case of the charging device (cradle) but to a case where a power source device (AC adaptor) is shared among a plurality of persons.

SUMMARY OF THE INVENTION

An object of the present invention is to enable charging to be performed from one of a plurality of electronic devices having a secondary battery as a power source to the other electronic devices.

In accordance with one aspect of the present invention, there is provided an electronic device having a secondary battery as a power source, comprising: a first interface arranged in one surface of the electronic device and including a first communicating section which performs data communication with a first external device by near field communication and a power receiving section which is capable of receiving electric power from the first external device without being in contact with the first external device and charging the secondary battery; a second interface arranged in another surface of the electronic device and including a second communicating section which performs data communication with a second external device by near field communication and a power transmitting section which is capable of transmitting electric power received from the secondary battery to the second external device without being in contact with the second external device; and a control section which controls operations of the first interface and the second interface.

In accordance with another aspect of the present invention, there is provided a non-transitory computer-readable storage medium having stored thereon a program that is executable by a computer in an electronic device which has a secondary battery as a power source and in which a first communicating section which performs data communication with a first external device by near field communication and a power receiving section which is capable of receiving electric power from the first external device without being in contact with the first external device and charging the secondary battery have been arranged in one surface and a second communicating section which performs data communication with a second external device by near field communication and a power transmitting section which is capable of transmitting electric power received from the secondary battery to the second external device without being in contact with the second external device have been arranged in another surface, the program being executable by the computer to perform functions comprising: first processing for causing the first communicating section to perform data communication with the first external device by near field communication and causing the power receiving section to receive electric power from the first external device without being in contact with the first external device and charge the secondary battery; second processing for causing the second communicating section to perform data communication with the second external device by near field communication and causing the power transmitting section to transmit electric power received from the secondary battery to the second external device without being in contact with the second external device; and control processing for controlling operations of the first processing and the second processing.

In accordance with another aspect of the present invention, there is provided a portable terminal having a second battery as a power source, comprising: a power receiving section which is arranged in one surface of a terminal body, and capable of performing data communication with a first external device by near field communication, receiving electric power from the first external device without being in contact with the first external device, and charging the secondary battery; a power transmitting section which is arranged in another surface of the terminal body, and capable of performing data communication with a second external device by near field communication, and transmitting electric power received from the secondary battery to the second external device without being in contact with the second external device; and a control section which controls operations of the power receiving section and the power transmitting section.

According to the present invention, charging from one of a plurality of electronic devices having a secondary battery as a power source to the other electronic devices can be performed.

The above and further objects and novel features of the present invention will more fully appear from the following detailed description when the same is read in conjunction with the accompanying drawings. It is to be expressly

BRIEF DESCRIPTION OF THE DRAWINGS

FIG. 4 is a flowchart for describing the operation of the electronic device 1 which is started when the power is turned on;

FIG. 6 is a flowchart for describing an operation that is started in a host device 5 connected to the charting device 2 when the power is turned on;

DETAILED DESCRIPTION OF THE PREFERRED EMBODIMENT

An embodiment of the present invention will hereinafter be described with reference to FIG. 1 to FIG. 7.

Figure 1:
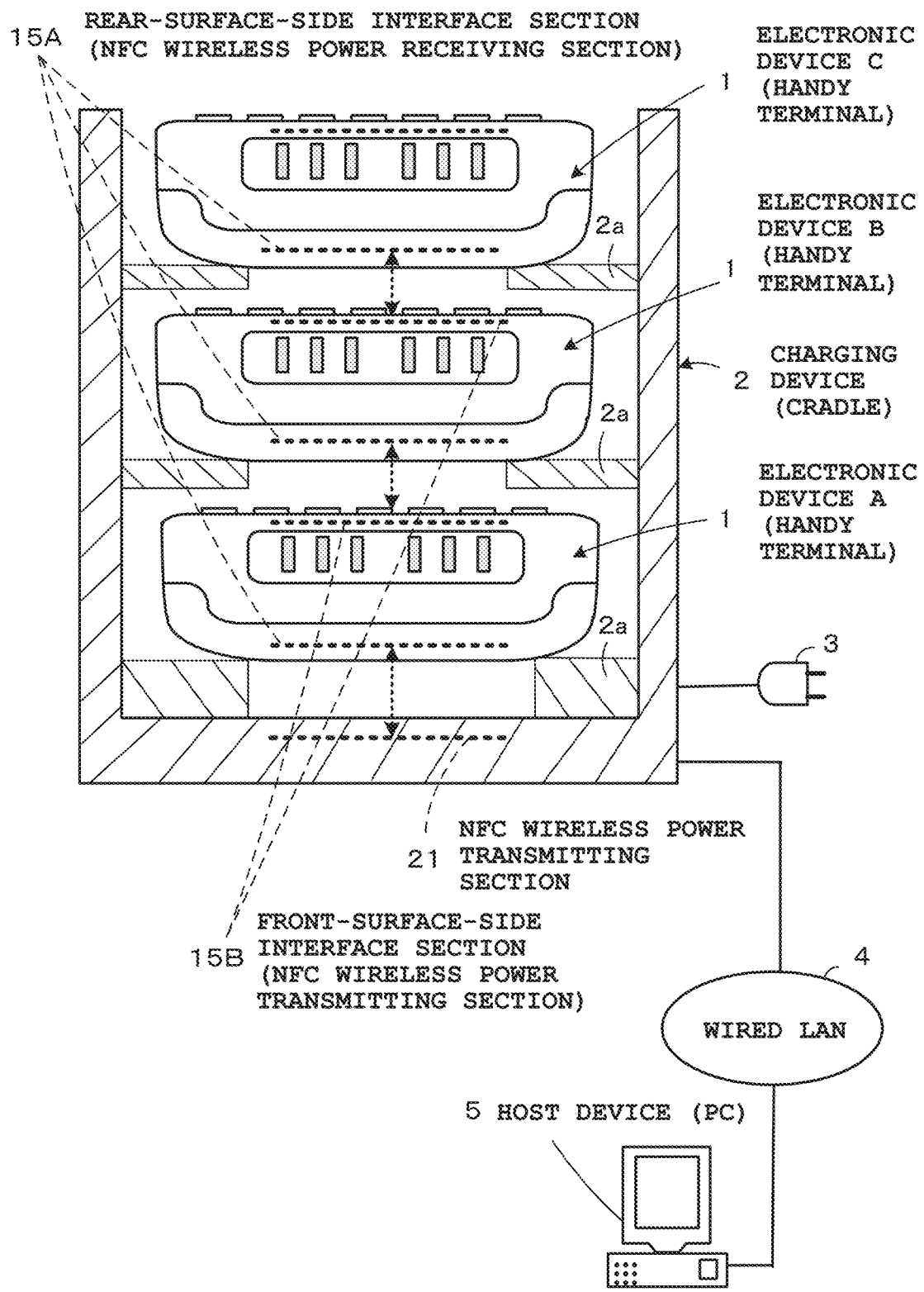
FIG. 1 is a sectional partial view for describing a state where a plurality of electronic devices 1 having a secondary battery as a power source have been placed in a charging device 2.

In this embodiment, the present invention has been applied in a portable terminal (handy terminal) for business purposes as an electronic device having a secondary battery as a power source. FIG. 1 is a sectional partial view for describing a state where a plurality of electronic devices 1 (handy terminals) 1 have been placed together in a charging device (cradle) 2 having a communication function.

These electronic devices (handy terminals) 1 are handy-type terminal devices for business at shops or the like, and each of them has a housing having a rectangular shape as a whole.

Each electronic device 1 has various functions, such as business management function for managing inventory, arrival, shipping, delivery, etc., a scanner function for optically reading bar codes and the like, a clock function for keeping the current date and time, a non-contact charging function, an NFC (Near Field Communication) function, a wireless communication function for wireless connection to a communication network (not depicted in the drawing), and a telephone function for wireless connection to a portable telephone network, and is driven with a secondary battery described below as a power source.

The charging device (cradle) 2 has a structure where a plurality of electronic devices (three electronic devices in the present embodiment) can be placed on top of one another in a vertical direction with a predetermined space (for example, a space of 10 cm or less) therebetween. This charging device 2 has a box-shaped housing having a substantially U-shape cross section, and the inner area of which has been partitioned into three areas by three partition plates 2a. In each of these areas, one electronic device 1 can be placed.

Each partition plate 2a is a rectangular frame formed by a center portion of a rectangular plate being cut off to create an opening, and supports the electronic device 1 placed thereon. When pulling out the electronic device 1 housed in (placed into) the charging device 2, or when placing it into the charging device 2, the user pulls it out from or places it into one end (opening) of the box-shaped housing. However, the way of pulling it out and the way of placing it in are not limited thereto, and can be arbitrarily determined.

Also, the charging device 2 is a stationary-type device to which an AC connector 3 is connected for power supply, and has various functions, such as a non-contact charging function, a NFC (Near Field Communication) function, and a communication function for connection to a host device (personal computer) 5 via a wired LAN (Local Area Network) 4. Although the components of the host device 5 are not shown in the drawing, the host device 5 has a CPU (Central Processing Unit), a storage section, a communicating section, etc., and has functions for transmitting various commands to each electronic device 1 placed in the charging device 2 and receiving data from each electronic device 1 so as to manage charging to each electronic device 1.

That is, when the plurality of electronic devices 1 have been placed in the charging device 2, if the battery remaining amount of one of the electronic devices 1 reaches a predetermined amount or higher by charging, the host device 5 starts charging for the next electronic device 1. Then, when the battery remaining amount of this electronic device 1 reaches the predetermined amount or higher, the host device 5 starts charging for the further next device 1. As such, the host device 5 causes the plurality of electronic devices 1 to be charged one by one.

Figure 4:
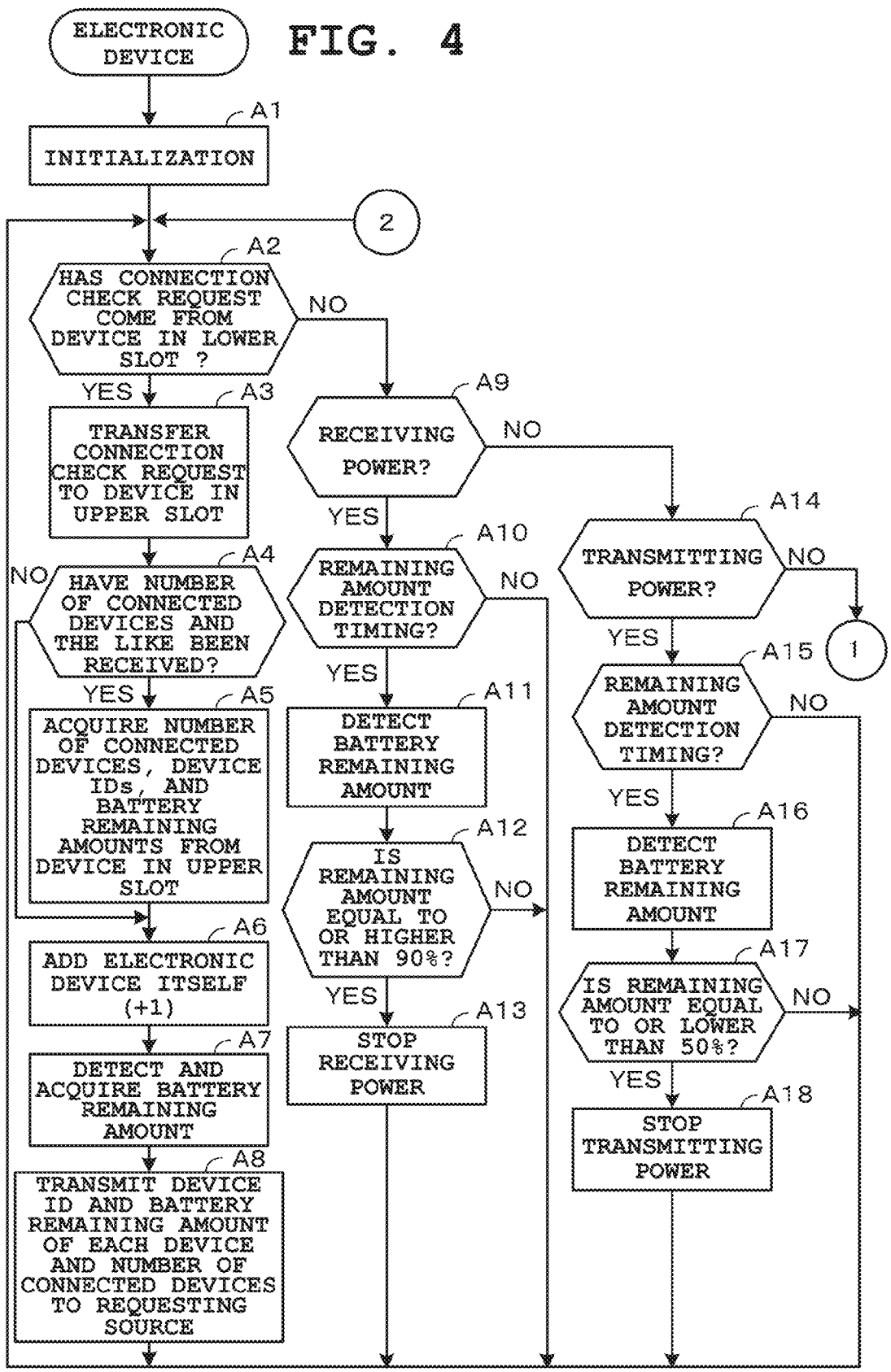
Figure 5:
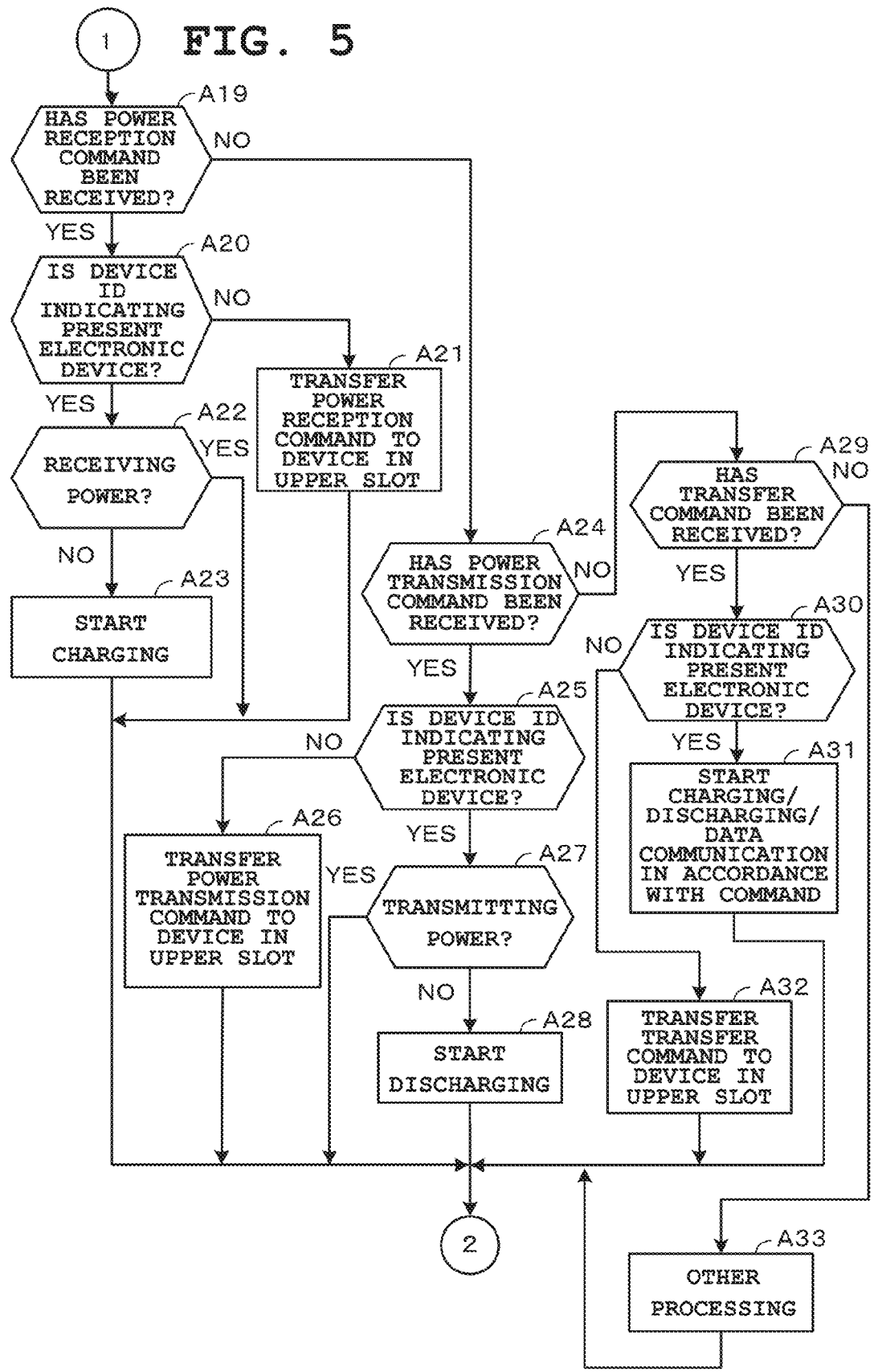
FIG. 5 is a flowchart following the operation of FIG. 4.

Although not shown in FIG. 4 and FIG. 5, after the battery remaining amounts of all of the electronic devices 1 reach the predetermined amount or higher, charging is further repeated until a power source section (secondary battery) 12 of each electronic device 1 is fully charged.

Figure 2:
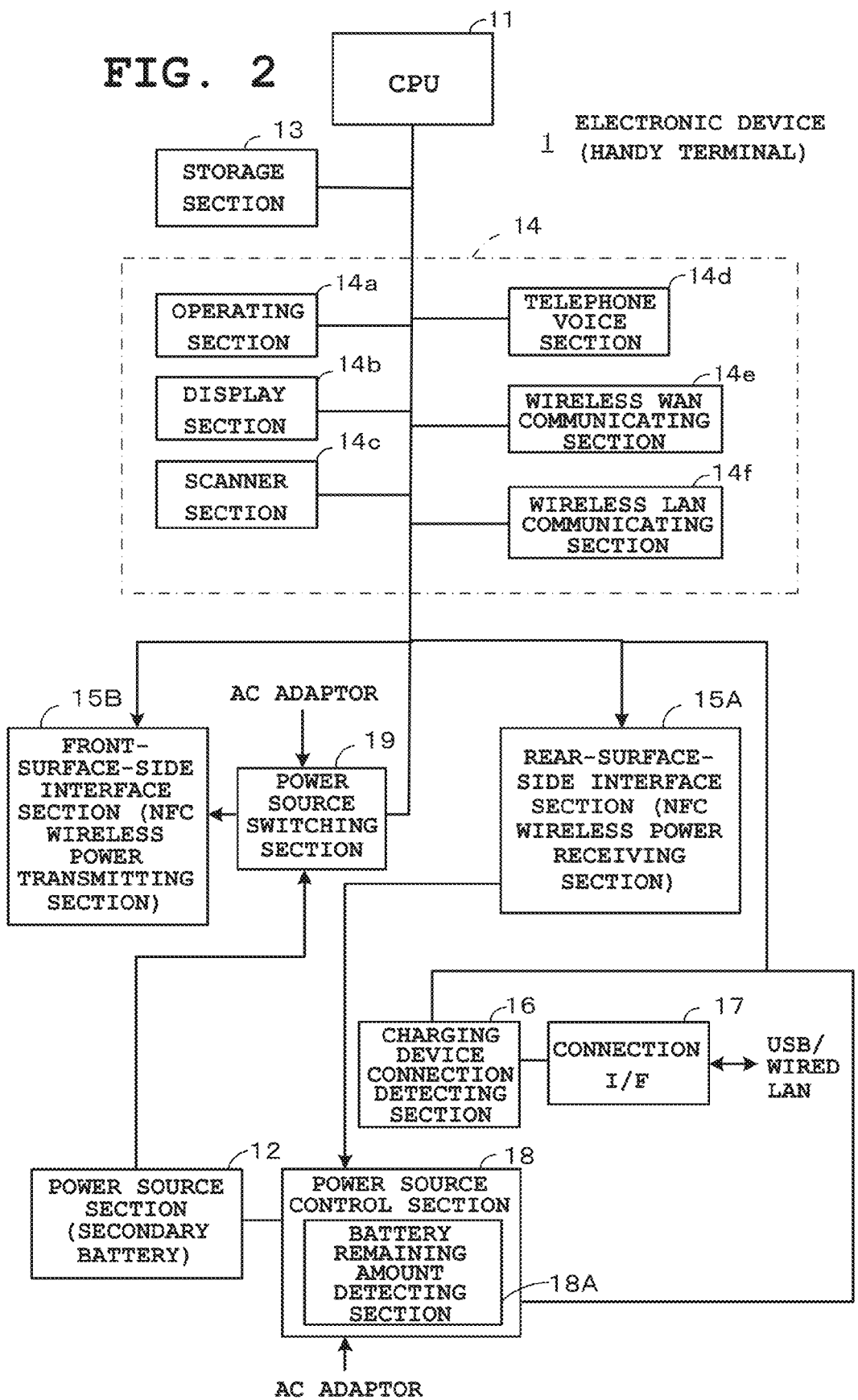
FIG. 2 is a block diagram showing basic components of the electronic device 1.

FIG. 2 is a block diagram depicting basic components of the electronic device (handy terminal) 1.

The electronic device 1 has a CPU 11 as its core. This CPU 11 is a central processing unit which operates by power supplied from the power source section 12 having a secondary battery and controls the entire operation of the electronic device 1 according to various programs in a storage section 13. The storage section 13 includes, for example, a ROM and a flash memory, and has stored therein a program for achieving the present embodiment and various applications according to an operation procedure depicted in FIG. 4 and FIG. 5 described below. Note that the storage section 13 may be structured to include, for example, a removable portable memory (storage medium) such as an SD (Secure Digital) card or an IC (Integrated Circuit) card, or may be structured to include, although not shown, a storage area on a predetermined server apparatus side in a case where the storage section 13 is connected to a network via a communication function.

As a basic input/output device 14 for the CPU 11, an operating section 14a, a display section 14b, a scanner section 14c, a telephone voice section 14d, a wireless WAN (Wide Area Network) 14e, a wireless LAN (Local Area Network) 14*f*, and the like are provided, and the CPU 11 controls the operation of these devices according to an input/output program.

Also, as other input/output devices, a rear-surface-side interface section (NFC (Near Field Communication) wireless power receiving section) 15A, a front-surface-side interface section (NFC wireless power transmitting section) 15B, a charging device connection detecting section 16, and the like are connected to the CPU 11.

The rear-surface-side interface section 15A is a first interface section (NFC wireless power receiving section) arranged (incorporated) in one surface, such as the rear surface (the surface on the side opposite to the operating section 14*a* and the display section 14*b*), of the electronic device 1.

The front-surface-side interface section 15B is a second interface section (NFC wireless power transmitting section) arranged (incorporated) on the other surface, such as the front surface (the surface on the side of the operating section 14*a* or the display section 14*b*), of the electronic device 1.

That is, the NFC wireless power receiving section and the NFC wireless power transmitting section constituting the rear-surface-side and front-surface-side interface sections 15A and 15B are interfaces that perform near-field wireless communication and wireless electric power feeding (electric power transmission and reception) by wirelessly transmitting and receiving electric power without using a power supply cable.

When performing wireless electric power feeding, the rear-surface-side interface section (NFC wireless power receiving section) 15A and the front-surface-side interface section (NFC wireless power transmitting section) 15B receive and transmit electric power by using non-contact electric power transmission, such as an electromagnetic induction method (contactless method). However, the method therefor is not limited to the electromagnetic induction method and may be another method, such as a resonant method.

Also, the rear-surface-side interface section 15A uses its NFC antenna as the electromagnetic induction coil (power receiving coil) of the wireless power receiving section, and the front-surface-side interface section 15B uses its NFC antenna as the electromagnetic induction coil (power transmitting coil) of the wireless power transmitting section. However, the present invention is not limited to this structure where the antennas are used as the coils, and a structure may be adopted where dedicated power receiving coil and power transmitting coil are provided.

The charging device connection detecting section 16 detects the electronic device 1 placed in the charging device 2, via a connection I/F (interface) 17. A power source control section 18 converts electric power received by the NFC wireless power receiving section 15A to a predetermined voltage for charging the power source section (secondary battery) 12.

The power source control section 18 includes a battery remaining amount detecting section 18A which detects the remaining amount of the power source section (secondary battery) 12 and informs the CPU 11 of the detected remaining amount. Also, the power source control section 18 switches between the charging of the power source section (secondary battery) 12 based on electric power received by the NFC wireless power receiving section 15A and that based on electric power supplied from an AC adaptor (omitted in the drawing) automatically or by a user operation.

Electric power discharged from the power source section (secondary battery) 12 is supplied to the NFC wireless power transmitting section 15B via a power source switching section 19, and a high-frequency alternating field is generated from the NFC antenna (omitted in FIG. 2) of the NFC wireless power transmitting section 15B by a power transmitting section thereof being activated.

The power source switching section 19 switches between electric power from the power source section (secondary battery) 12 and that from the AC adaptor (omitted in the drawing) automatically or by a user operation, by which electric power to be supplied to the NFC wireless power transmitting section 15B is switched.

FIG. 1 shows a state where the plurality of (three) electronic devices 1 structured as described above have been placed in the charging device 2 with their rear surface sides being oriented downward. Specifically, a lowermost (first slot) electronic device 1 has been arranged such that its rear-surface-side interface section (NFC wireless power receiving section) 15A is opposed to a NFC wireless power transmitting section 21 of the charging device 2 with a predetermined space (for example, 1 to 2 cm) therebetween.

In addition, a second slot electronic device 1 has been arranged such that its rear-surface-side interface section (NFC wireless power receiving section) 15A is opposed to the front-surface-side interface section (NFC wireless power transmitting section) 15B of the first slot electronic device 1 with a predetermined space (for example, 1 to 2 cm: the same applies hereafter) therebetween.

Moreover, a third slot electronic device 1 has been arranged such that its rear-surface-side interface section (NFC wireless power receiving section) 15A is opposed to the front-surface-side interface section (NFC wireless power transmitting section) 15B of the second slot electronic device 1 with a predetermined space therebetween.

When three electronic devices 1 are in the charging device 2 as described above, communication between the electronic device 1 and the charging device 2 and between adjacent electronic devices 1 is performed in a NFC active communication mode, and request transmission by an initiator and response transmission by a target are performed by data communication by the generation of electric waves.

Note that the rear-surface-side interface section 15A is hereinafter referred to as the NFC wireless power receiving section 15A, and the front-surface-side interface section 15B is hereinafter referred to as the NFC wireless power transmitting section 15B. Also, in some cases described below, the first slot electronic device 1 is referred to as electronic device A, the second slot electronic device 1 is referred to as electronic device B, and the third slot electronic device 1 is referred to as electronic device C.

In the example of FIG. 1, electronic device A is supplied with electric power from the charging device 2 or the AC adaptor, and performs data communication with the host device 5 via the wired LAN 4.

Also, when functioning as an initiator, electronic device A is connected to electronic device B functioning as a target, and notifies electronic device B of a command from the host device 5. Similarly, when electronic device B is functioning as an initiator, it is connected to electronic device C functioning as a target, and notifies electronic device C of a command from the host device 5.

That is, electronic device B operates as an initiator/target, and serves as a through device for relaying data such as a command.

Figure 3:
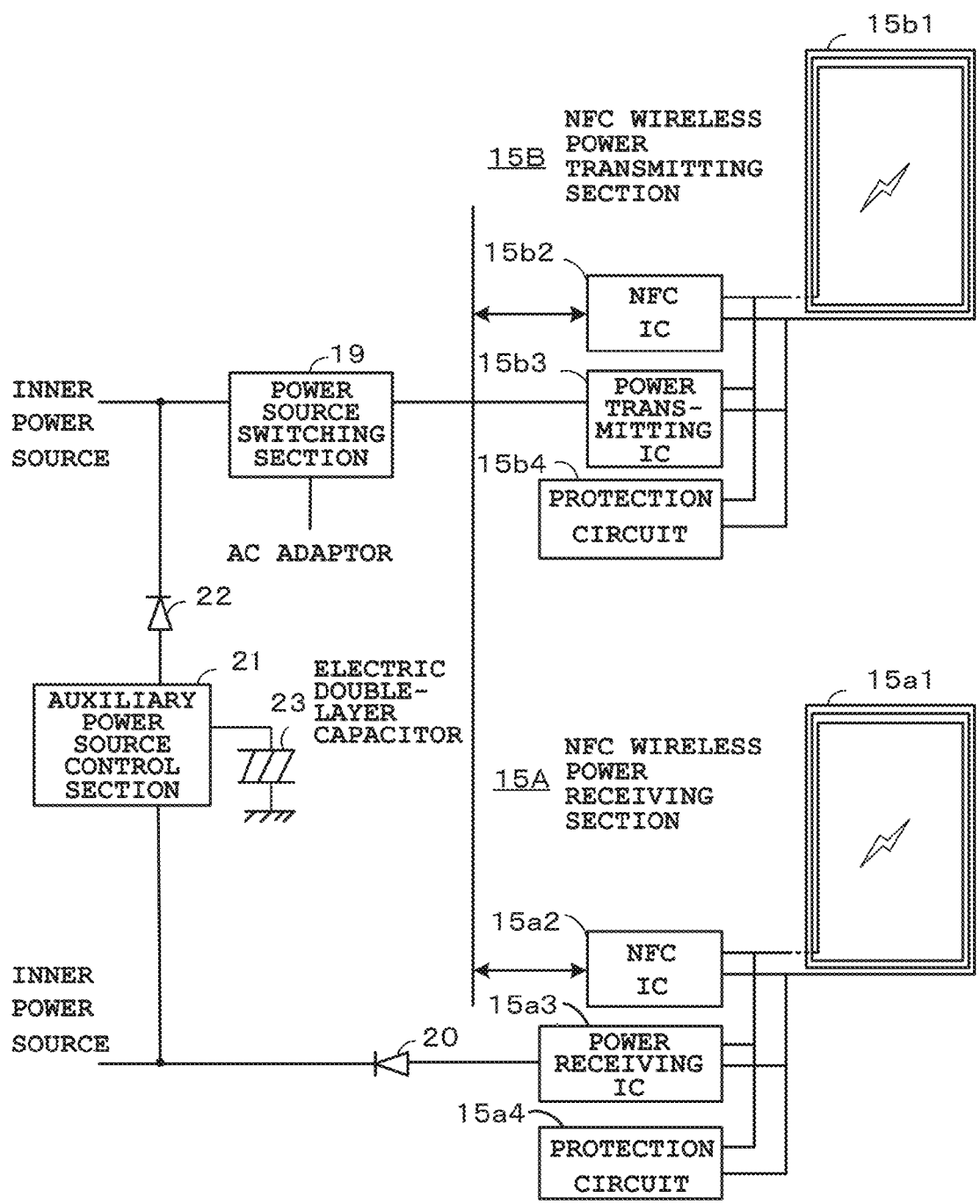
FIG. 3 is a diagram showing the structure of an NFC wireless power receiving section 15A and an NFC wireless power transmitting section 15B in the electronic device 1.

FIG. 3 is a diagram showing the structure of the NFC wireless power receiving section 15A and the NFC wireless power transmitting section 15B in the electronic device 1.

The NFC wireless power receiving section 15A has an NFC antenna 15a1, an NFC IC 15a2, a power receiving IC 15a3, and a protection circuit 15a4.

The NFC wireless power transmitting section 15B has an NFC antenna 15b1, an NFC IC 15b2, a power transmitting IC 15b3, and a protection circuit 15b4.

The NFC antenna 15a1, the NFC IC 15a2, the NFC antenna 15b1, and the NFC IC 15b2 are used for near-field wireless data communication.

The NFC antenna 15a1, the power receiving IC 15a3, the NFC antenna 15b1, and the power transmitting IC 15b3 are used for electric power feeding by non-contact electric power transmission. In the present embodiment, the power receiving IC 15a3 and the power transmitting IC 15b3 do not operate simultaneously, and therefore one of them does not operate when the other one is operating.

The power transmitting IC 15b3 of the NFC wireless power transmitting section 15B generates a high-frequency alternating field from the NFC antenna 15b1. Then, the power receiving IC 15a3 of the NFC wireless power receiving section 15A generates an alternating voltage according to the alternating field received by the NFC antenna 15a1, and converts it to a direct voltage. This direct voltage is converted by the power source control section 18 to a predetermined voltage for charging, and is used to charge the power source section (secondary battery) 12. The protection circuits 15a4 and 15b4 are circuits for protecting the power receiving IC 15a3 and the power transmitting IC 15b3 against overvoltage, etc. The output side of the power receiving IC 15a3 is connected to the power source control section 18 and an auxiliary power source control section 21 via a backflow prevention circuit 20.

The auxiliary power source control section 21 supplies electric power from the power source section (secondary battery) 12 to the power source switching section 19 via a backflow prevention circuit 22. Also, the auxiliary power source control section 21 supplies electric power from an electric double-layer capacitor 23 serving as an auxiliary power source to the power source switching section 19 via the backflow prevention circuit 22.

Note that, although the electric double-layer capacitor 23 is used by being switched from the power source section (secondary battery) 12, the present invention is not limited thereto.

As such, in the present embodiment, the electronic device (handy terminal) 1 is an electronic device having the secondary battery 12 as a power source, and includes a first interface section (rear-surface-side interface section (NFC wireless power receiving section) 15A) arranged in one surface of the electronic device and including a communicating section which performs data communication with an external device (another electronic device 1 or the charging device 2) by near field communication and a power receiving section which is capable of receiving electric power from the external device without being in contact with it and charging the secondary battery; a second interface section (front-surface-side interface section (NFC wireless power transmitting section) 15B) arranged in another surface of the electronic device and including a communicating section which performs data communication by near field communication with an external device and a power transmitting section which is capable of transmitting electric power from the secondary battery 12 to the external device without being in contact with it; and a control section (the CPU 11, the storage section 13, and the charging device connection detecting section 16) which controls the operations of the first interface section and the second interface section.

Next, the operation concept of the electronic device 1 of the present embodiment is described with reference to flowcharts shown in FIG. 4 and FIG. 5, and the operation concept of the host device 5 is described with reference to flowcharts shown in FIG. 6 and FIG. 7.

Here, each function described in these flowcharts is stored in a readable program code format, and operations based on these program codes are sequentially performed.

Also, operations based on the above-described program codes transmitted over a transmission medium such as a network can also be sequentially performed.

That is, the unique operations of the present embodiment can be performed using programs and data supplied from an outside source over a transmission medium, in addition to a recording medium.

FIG. 4 and FIG. 5 show flowcharts for describing the operation (a characteristic operation of the present embodiment) of the electronic device 1 which is started when the power is turned on. FIG. 6 is a flowchart for describing the operation (a characteristic operation of the present embodiment) of the host device 5 which is started when the power is turned on.

First, the CPU 11 of the electronic device 1 performs initialization processing for clearing the memory or the like in response to a power-on operation (Step A1 in FIG. 4). Then, the CPU 11 judges whether the wireless power receiving section 15A has received a request for checking the number of connected devices from an electronic device 1 in a lower slot or the charging device 2 (Step A2 in FIG. 4), judges whether the NFC wireless power receiving section 15A is receiving electric power (Step A9 in FIG. 4), and judges whether the NFC wireless power transmitting section 15B is transmitting electric power (Step A14 in FIG. 4).

In addition, the CPU 11 of the electronic device 1 judges whether the NFC wireless power receiving section 15A has received a power reception command (Step A19 in FIG. 5), a power transmission command (Step A24 in FIG. 5), or a transfer command (Step A29 in FIG. 5).

When a judgment result at each of the above-described Steps A2, A9, A14, A19, A24, and A29 is NO, the CPU 11 returns to Step A33 in FIG. 5 and performs operation management processing or the like.

Here, when going home after finishing work for the day, a working staff places his or her electronic device 1 in the charging device 2. As a result, the electronic device 1 is charged from when the staff leaves the office to when the staff comes to the office again.

Figure 6:
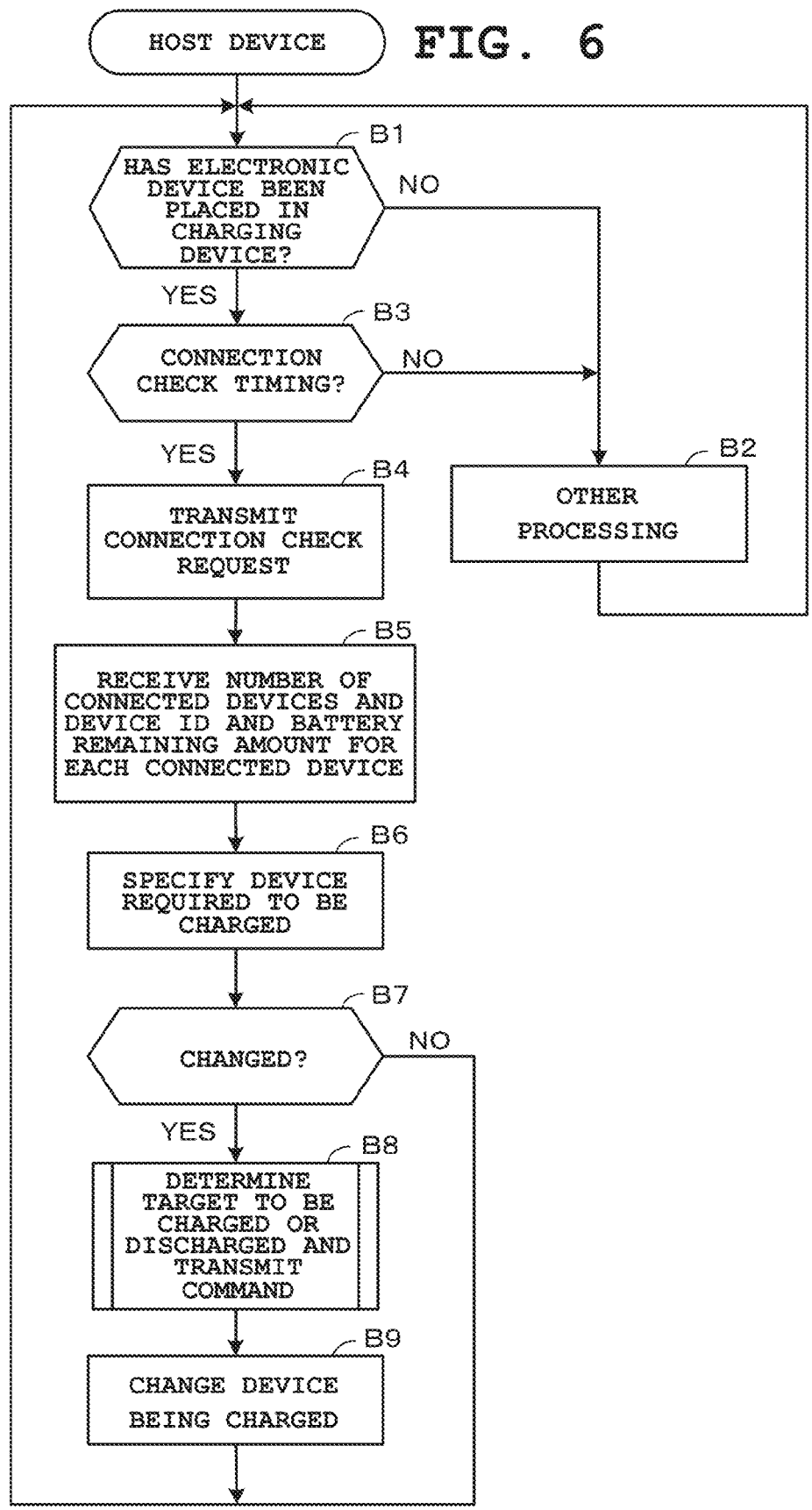

The CPU of the host device 5 judges whether a detection signal indicating the placement of the electronic device 1 has been received from the charging device 2 (Step B1 in FIG. 6).

When the electronic device 1 has not been placed in the charging device 2 (NO at Step B1), the CPU performs processing other than charging (Step B2) Conversely, when the electronic device 1 has been placed in the charging device 2 (YES at Step B1), the CPU judges whether timing (for example, thirty-second intervals) for checking the number of electronic devices 1 connected to the charging device 2 has come (Step B3).

When judged that timing for checking the number of connected devices has not come (NO at Step B3), the CPU performs processing other than charging (Step B2). Conversely, when judged that timing for checking the number of connected devices has come (YES at Step B3), the CPU transmits a request for checking the number of connected devices to electronic device A in the lowermost slot (first slot) by NFC via the charging device 2 (Step B4). Then, the CPU enters a response wait state and stays in this state until the number of connected devices is transmitted from electronic device A.

When the request for checking the number of connected devices is received from a device at a lower position (the charging device 2 when the electronic device 1 is electronic device A) (YES at Step A2 in FIG. 4), the electronic device 1 transfers the request for checking the number of connected devices to an electronic device 1 in a higher slot (electronic device B when the electronic device 1 is electronic device A) (Step A3).

Here, the electronic device 1 in the higher slot transmits its device ID and battery remaining amount in addition to the number of connected devices.

When the number of connected devices, the device ID, and the battery remaining amount are sent from the electronic device 1 in the higher slot (YES at Step A4), the CPU 11 of the electronic device 1 receives and acquires the number of connected devices, the device ID, and the battery remaining amount (Step A5), and performs processing for adding "1" to the number of devices so as to add itself to the received number of connected devices (Step A6).

Here, when the electronic device 1 is electronic device A, if electronic device B is only device that is present in higher slots, the number of connected devices received and acquired from the electronic device 1 in the higher slot is one. If there are electronic devices B and C in the higher slots, the number of connected devices is two.

Note that, when the number of connected devices from an electronic device 1 in a higher slot is not received (NO at Step A4), or in other words, when the electronic device 1 is electronic device C in the uppermost slot, the CPU 11 performs processing for adding itself (adding "1") to the number of connected devices (0) (Step A6).

Then, the CPU 11 acquires the battery remaining amount of the power source section (secondary battery) 12 detected by the battery remaining amount detecting section 18A of the power source control section 18 (Step A7), and transmits its device ID and battery remaining amount and the number of connected devices together with the device ID and the battery remaining amount of the electronic device 1 in the higher slot from the NFC wireless power transmitting section 15B to the requesting source by NFC (Step A8). Then, the CPU 11 returns to Step A2.

When the device ID and battery remaining amount of each electronic device 1 and the number of connected devices are received from electronic device A via the charging device 2 (Step B5 in FIG. 6), the CPU of the host device 5 specifies an electronic device 1 that requires charging, based on the battery remaining amount of each electronic device 1 (Step B6).

For example, an electronic device 1 whose battery remaining amount is lower than 90% is specified as a target to be charged. Then, the CPU judges whether the device ID of an electronic device 1 being charged and the device ID of the electronic device 1 specified as the target to be charged this time are identical to each other, or in other words, judges whether the target of charging has been changed (Step B7). When judged that the target of charging has not been changed (NO at Step B7), the CPU returns to Step B1. Conversely, when judged that the target of charging has been changed (YES at Step B7), the CPU performs processing for determining a target device to be charged or discharged (a target device that receives or transmits electric power) and transmitting a command (Step B8).

Then, after performing processing for switching the device ID of the electronic device 1 being charged to that of the newly specified target in response to the change of the target of charging (Step B9), the CPU returns to Step B1.

Figure 7:
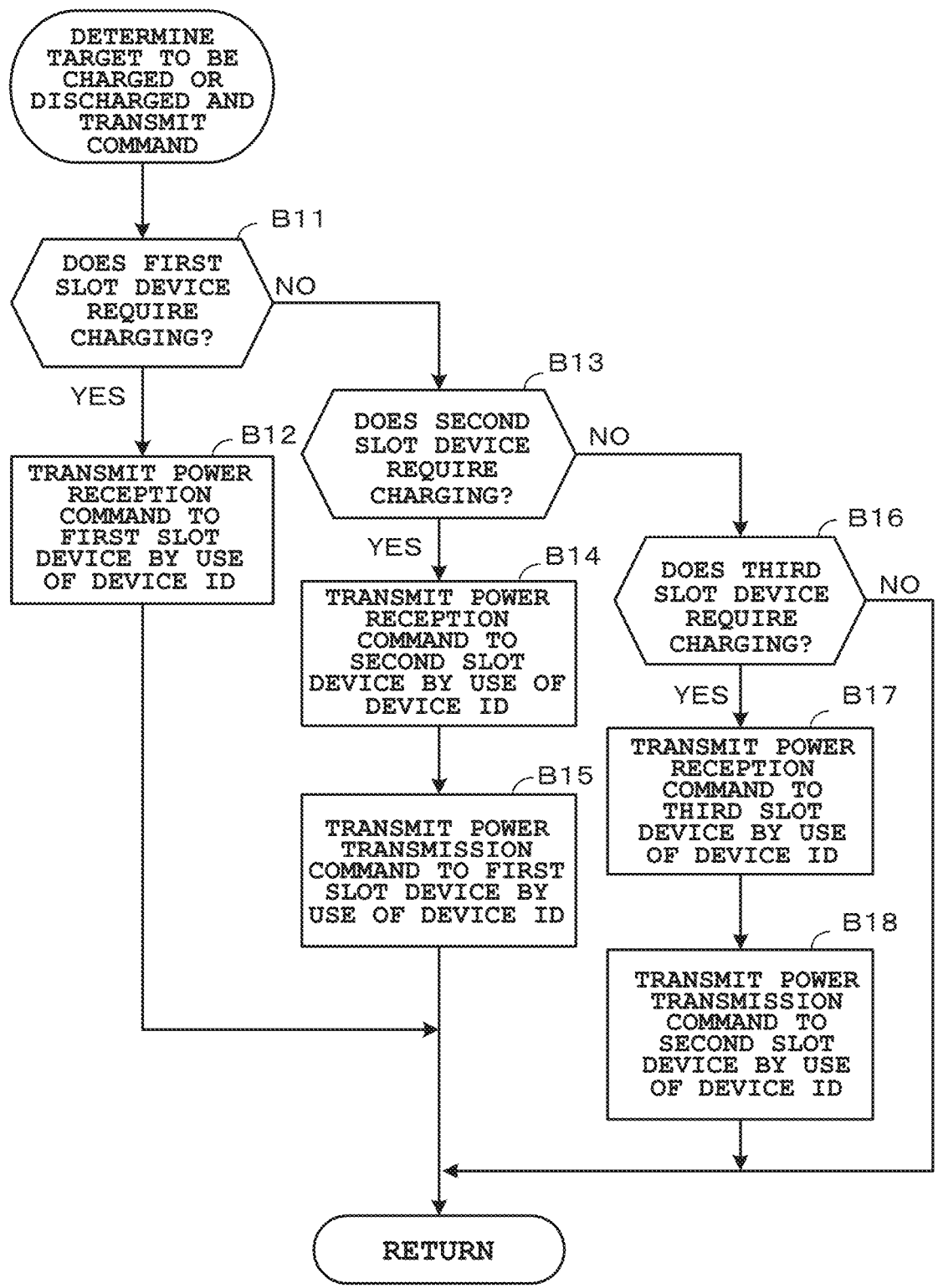
FIG. 7 is a flowchart for providing a detailed description regarding processing for determining a device to be charged or discharged and transmitting a command.

FIG. 7 is a flowchart for describing in detail the processing of the host device 5 for determining a device to be charged or discharged and transmitting a command (Step BB in FIG. 6).

First, The CPU of the host device 5 judges whether electronic device A in the first slot is required to be charged (whether its battery remaining amount is lower than 90%) (Step B11), whether electronic device B in the second slot is required to be charged (whether its battery remaining amount is lower than 90%) (Step B13), and whether electronic device C in the third slot is required to be charged (whether its battery remaining amount is lower than 90%) (Step B16).

Here, when judged that electronic device A in the first slot is required to be charged (YES at Step B11), the CPU transmits a power reception command to electronic device A, using its device ID (Step B12). In this case, the command is transmitted to this electronic device A in the first slot via the charging device 2 (the same applies to the following cases).

Also, when judged that electronic device B in the second slot is required to be charged (YES at Step 613), the CPU transmits a power reception command to electronic device B in the second slot together with its device ID (Step B14), and also transmits a power transmission command to electronic device A in the first slot in the lower area together with its device ID (Step B15).

Moreover, when judged that electronic device C in the third slot is required to be charged (YES at Step B16), the CPU transmits a power reception command to electronic device C in the third slot together with its device ID (Step B17), and also transmits a power transmission command to electronic device B in the second slot in the lower area together with its device ID (Step 618).

As such, charging to electronic device A in the first slot is provided with the highest priority, and charging to electronic device B in the second slot is provided with the next priority. Then, charging to electronic device C in the third slot is performed last.

When the electronic device 1 receives a power reception command and its device ID by the NFC wireless power receiving section 15A (YES at Step A19 in FIG. 5), the CPU 11 judges whether the power reception command is a command directed to this device, based on the device ID (Step A20).

Here, when judged that the power reception command is not a command directed to this device (NO at Step A20), the CPU 11 transfers the power reception command and the device ID from the NFC wireless power transmitting section 15B to the upper-level electronic device 1 (Step A21).

Conversely, when judged that the power reception command is a command directed to this device (YES at Step A20), the CPU 11 judges whether the electronic device 1 is being charged, based on operation of the power source control section 18 (Step A22). When judged that the electronic device 1 is not being charged (NO at Step A22), the CPU 11 instructs the power source control section 18 to charge on condition that a connection has been detected by the charging device connection detecting section 16, and thereby starts charging to the power source section (secondary battery) 12 (Step A23). Then, the CPU 11 returns to Step A2 in FIG. 4.

Also, when the electronic device 1 receives a power transmission command and its device ID by the NFC wireless power receiving section 15A (YES at Step A24), the CPU 11 judges whether the power transmission command is a command directed to this device, based on the device ID (Step A25). Here, when judged that the power transmission command is not a command directed to this device (NO at Step A25), the CPU 11 transfers the power transmission command and the device ID from the NFC wireless power transmitting section 15B to the upper-level electronic device 1 (Step A26).

Conversely, when judged that the power transmission command is a command directed to this device (YES at Step A25), the CPU 11 judges whether the electronic device 1 is being discharged, based on operation of the power source control section 18, (Step A27). When judged that the electronic device 1 is not being discharged (NO at Step A27), the CPU 11 instructs the power source control section 18 to discharge on condition that a connection has been detected by the charging device connection detecting section 16, and thereby starts the discharging of the power source section (secondary battery) 12 (Step A28). Then, the CPU 11 returns to Step A2 in FIG. 4.

Moreover, when the electronic device 1 receives a transfer command and its device ID by the NFC wireless power receiving section 15A (YES at Step A29), the CPU 11 judges whether the transfer command is a command directed to this device, based on the device ID (Step A30). Here, when judged that the transfer command is not a command directed to this device (NO at Step A30), the CPU 11 transfers the transfer command and the device ID from the NFC wireless power transmitting section 15B to the upper-level electronic device 1 (Step A32).

Conversely, when judged that the transfer command is a command directed to this device (YES at Step A30), the CPU 11 starts the charging or discharging of the power source section (secondary battery) 12 or data communication in accordance with the transfer command (Step A31).

In this case as well, the charging, discharging, or data communication is started on condition that the electronic device 1 is not being charged or discharged and a connection has been detected by the charging device connection detecting section 16.

In the data communication (NFC: Near Field Communication) of this case, data such as business data or system update data is transmitted in accordance with the transfer command directed to the electronic device 1. Then, the CPU 11 returns to Step A2 in FIG. 4.

At Step A9, when the electronic device 1 is being charged (YES at Step A9 in FIG. 4), the CPU 11 judges whether timing (for example, thirty-second intervals) for detecting a battery remaining amount has come (Step A10). When judged that battery remaining amount detection timing has not come (NO at Step A10), the CPU 11 returns to the above-described Step A2. Conversely, when judged that battery remaining amount detection timing has come (YES at Step A10), the CPU 11 acquires the battery remaining amount of the power source section (secondary battery) 12 detected by the battery remaining amount detecting section 18A of the power source control section 18 (Step A11), and judges whether the battery remaining amount is equal to or higher than 90% (Step A12).

Here, when judged that the battery remaining amount is less than 90% (NO at Step A12), the CPU 11 returns to the above-described Step A2 to continue the charging. When judged that the battery remaining amount is equal to or higher than 90% (YES at Step A12), the CPU 11 temporarily stops the charging at this point (Step A13).

At Step A14, when the electronic device 1 is being discharged (YES at Step A14), the CPU 11 judges whether timing (for example, sixty-second intervals) for detecting a battery remaining amount has come (Step A15). When judged that battery remaining amount detection timing has not come (NO at Step A15), the CPU 11 returns to the above-described Step A2. Conversely, when judged that battery remaining amount detection timing has come (YES at Step A15), the CPU 11 acquires the battery remaining amount of the power source section (secondary battery) 12 detected by the battery remaining amount detecting section 18A of the power source control section 18 (Step A16), and judges whether the battery remaining amount is equal to or less than 50% (Step A17).

Here, when judged that the battery remaining amount is more than 50% (NO at Step A17), the CPU 11 returns to the above-described Step A2 to continue the discharging. When judged that the battery remaining amount is equal to or less than 50% (YES at Step A17), the CPU 11 temporarily stops the discharging at this point (Step A18).

Hereafter, until the battery remaining amount of each electronic device 1 reaches 90% or higher, the above-described operation is repeated. That is, when the plurality of electronic devices 1 have been placed in the charging device 2, if the battery remaining amount of one of these electronic devices 1 reaches 90% or higher by charging, charging to the next electronic device 1 whose battery remaining amount is less than 90% is started. Then, when the battery remaining amount thereof reaches 90% or higher, charging to the further next electronic device 1 whose battery remaining amount is less than 90% is started. That is, this operation is performed on the electronic devices 1 one by one.

Although not shown in FIG. 4 and FIG. 5, after the battery remaining amounts of all of the electronic devices 1 reach 90% or higher, further charging or discharging is repeatedly performed until the power source section (secondary battery) 12 of each electronic device 1 is fully charged or discharged.

As described above, the electronic device 1 of the present embodiment having the power source section (secondary battery) 12 as a power source includes the rear-surface-side interface section (NFC wireless power receiving section) 15A placed in one surface (rear surface) thereof and the front-surface-side interface section (NFC wireless power transmitting section) 15B placed in the other surface (front surface), and controls the charging or discharging of the power source section (secondary battery) 12. As a result of this configuration, only by the plurality of electronic devices 1 being placed such that the front surface of one electronic device 1 and the rear surface of another electronic device 1 are opposed to each other, charging from one electronic device 1 to another electronic device can be achieved. Thus, the present invention is useful when the users are short on time. In addition, since a plurality of electronic devices can be charged with one charging device or power source device, charging devices or power source devices are not required to be prepared for each electronic device, which is excellent in view of installation space and cost saving.

Also, the electronic device 1 judges whether a power reception command received by the NFC wireless power receiving section 15A is a command directed to this device and, when the command is judged to be a command directed to this device, starts charging to the power source section (secondary battery) 12 in accordance with the power reception command. As a result of this configuration, even in a state where the plurality of electronic devices 1 have been placed in one charging device 2, each electronic device 1 can perform charging in accordance with an instruction from the host device 5.

Moreover, the electronic device 1 judges whether a power transmission command received by the NFC wireless power receiving section 15A is a command directed to this device and, when the command is judged to be a command directed to this device, wirelessly transmits electric power from the power source section (secondary battery) 12 in accordance with the power transmission command. As a result of this configuration, even in a state the plurality of electronic devices 1 have been placed in one charging device 2, each electronic device 1 can wirelessly transmit electric power from the power source section (secondary battery) 12 serving as a power supply source to another electronic device 1 in accordance with an instruction from the host device 5.

Furthermore, the electronic device 1 judges whether a power transmission command received by the NFC wireless power receiving section 15A is a command directed to this device and, when the command is judged not to be a command directed to this device, transmits the command from the NFC wireless power transmitting section 15B to relay the command. As a result of this configuration, commands can be easily relayed via the NFC wireless power receiving section 15A and the NFC wireless power transmitting section 15B.

Still further, when a command received by NFC by the NFC wireless power receiving section 15A is a command for inquiring about the number of connected devices, the electronic device 1 transmits the inquiry command from the NFC wireless power transmitting section 15B. Then, using the NFC wireless power receiving section 15A, the electronic device 1 notifies the inquiring source of the number of connected devices updated based on a response result received from the transmission destination. As a result of this configuration, the number of connected devices can be sequentially transferred while being exchanged among the plurality of electronic devices 1.

Yet still further, when a battery remaining amount detected by the battery remaining amount detecting section 18A of the power source control section 18 is less than a predetermined value, the electronic device 1 starts an operation of charging the power source section (secondary battery) 12. When a battery remaining amount detected by the battery remaining amount detecting section 18A is equal to or higher than the predetermined value, the electronic device 1 wirelessly transmits electric power from the power source section (secondary battery) 12. As a result of this configuration, charging and electric power transmission can be controlled based on a battery remaining amount.

Yet still further, the rear-surface-side interface section 15A of the electronic device 1 uses its NFC antenna as the electromagnetic induction coil of the wireless power receiving section, and the front-surface-side interface section 15B uses its NFC antenna as the electromagnetic induction coil of the wireless power transmitting section. As a result of this configuration, even though two interface sections 15A and 15B are provided, the structure is not complicated.

Yet still further, the electronic device 1 has the electric double-layer capacitor 23 as an auxiliary power source for the power source section (secondary battery) 12. As a result of this structure, charging and electric power transmission can be appropriately controlled as compared with a structure where only the power source section (secondary battery) 12 is provided.

In the above-described embodiment, when wirelessly transmitting electric power from the power source section (secondary battery) 12, the electronic device 1 wirelessly transmits electric power irrespective of its operation mode. However, for example, a configuration may be adopted in which, when data communication is being performed, wireless electric power transmission is temporarily suspended. Also, a configuration may be adopted in which this data communication is forcibly stopped.

That is, a configuration may be adopted in which the CPU 11 judges a current operation mode when starting wireless electric power transmission, and controls the wireless electric power transmission according to the operation mode or controls the operation mode. For example, by the communication mode being switched to a power-saving mode (suspend mode), an overlap between heavy load driving and wireless electric power transmission can be avoided.

Also, a configuration may be adopted in which, when a heavy load circuit is being driven in the power source section (secondary battery) 12, wireless electric power transmission is performed by using electric power from the electric double-layer capacitor 23.

Moreover, in the above-described embodiment, when the battery remaining amount of the first slot electronic device 1 reaches a predetermined amount (90%) or higher by charging, electric power transmission from this first slot electronic device 1 to the second slot electronic device 1 is started. However, a configuration may be adopted in which the power source section (secondary battery) 12 of the first slot electronic device 1 is charged by electric power supplied from the charging device 2, and electric power transmission to the second slot electronic device 1 is simultaneously performed by electric power from the charging device 2 being directly supplied to the front-surface-side interface section (NFC wireless power transmitting section) 15B of the first slot electronic device 1. As a result of this configuration, charging efficiency in the entire area can be enhanced.

Furthermore, in the above-described embodiment, electric power from the power source section (secondary battery) 12 of the electronic device 1 in a lower slot is transmitted from the front-surface-side interface section (NFC wireless power transmitting section) 15B on condition that the battery remaining amount of this electronic device 1 is equal to or higher than 90%. However, the battery remaining amount serving as a condition for electric power transmission is not limited to 90% or higher, and may be 80% or the like.

Still further, the present invention is not limited to the configuration where electric power from the power source section (secondary battery) 12 is discharged via the rear-surface-side interface section (NFC wireless power receiving section) 15A, and a configuration may be adopted in which electric power received by the rear-surface-side interface section (NFC wireless power receiving section) 15A of the electronic device 1 is directly transmitted (relayed) from the front-surface-side interface section (NFC wireless power transmitting section) 15B.

By electric power being relayed as described above, for example, an electronic device 1 specified by a user operation can be charged with the highest priority, or an electronic device 1 having the lowest battery remaining amount can be charged with the highest priority from among electronic devices 1 that require charging.

Yet still further, in the above-described embodiment, switching from electric power reception (charging) to electric power transmission for transmitting electric power from the power source section (secondary battery) 12 to an electronic device 1 in an upper slot is performed on condition that the battery remaining amount of an electronic device 1 in a lower slot is equal to or higher than 90%. However, the charging and discharging of the power source section (secondary battery) 12 may be performed simultaneously.

In this configuration, the ratio between charging and discharging is set at, for example, 2:1 so as to reduce the deterioration of the secondary battery and the like.

Yet still further, in the above-described embodiment, the plurality of electronic devices 1 have been placed in one charging device 2 for charging. However, a configuration may be adopted in which the plurality of electronic devices 1 are connected to one AC adaptor for charging.

Figure 8:
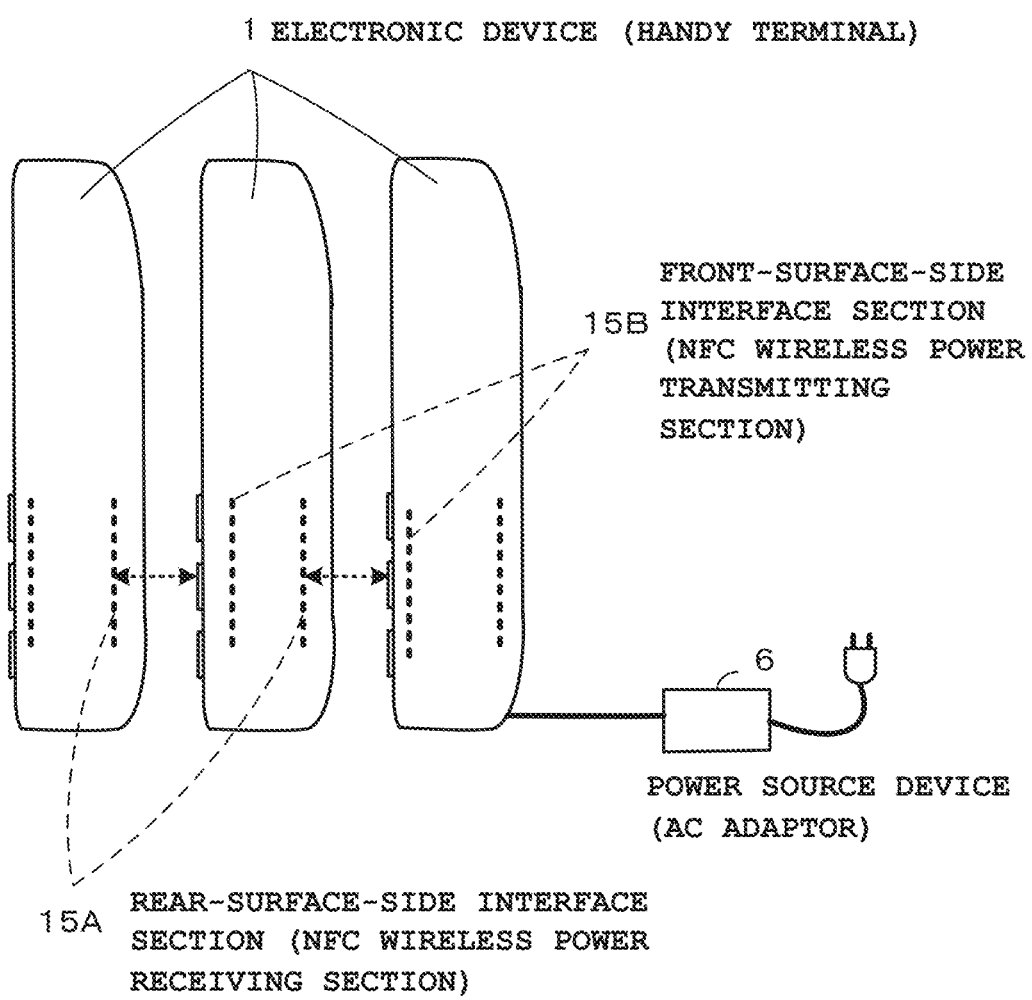
FIG. 8 is a diagram for describing a modification example of a embodiment, in which three electronic devices 1 are placed close to or on top of one another and each of them is charged by using an AC adaptor 6.

FIG. 8 is a diagram for describing a modification example of the present embodiment, in which three electronic devices 1 are placed close to or on top of one another and each of them is charged by using an AC adaptor 6.

In this case, the front-surface-side interface section (NFC wireless power transmitting section) 15B of one of two adjacent electronic devices 1 is placed close to or on top of the rear-surface-side interface section (NFC wireless power receiving section) 15A of the other electronic device 1.

Here, one of these three electronic devices 1, such as an electronic device 1 to which the power source device (AC adaptor) 6 has been directly connected, functions as a host device. This electronic device 1 functioning as a host device basically performs operations similar to those of the host device 5 described above.

That is, the electronic device 1 functioning as a host device transmits a request for checking the number of connected device to the next electronic device 1 when checking the number of connected electronic devices 1, enters a response wait state, and stays in this state until the number of connected devices is transmitted from that electronic device 1 in response to the request. Then, when the number of connected devices is received, the electronic device 1 performs processing for specifying an electronic device 1 that requires charging, determining this electronic device 1 as a target for charging or discharging (electric power reception or transmission), and transmitting a power reception command or a power transmission command.

Yet still further, in the above-described embodiment, the plurality of electronic devices 1 have been placed in the charging device 2 for charging. However, a configuration may be adopted in which two electronic devices 1 are placed close to or on top of each other, and one of the electronic devices 1 serves as a power supply source (electric power transmission side) for charging the other electronic device 1 without using the charging device 2 or the power source device (AC adaptor) 6.

In this case, for example, a configuration may be adopted in which an electronic device 1 whose battery remaining amount is high serves as a device on an electric power transmission side and charges an electronic device 1 whose battery remaining amount is low.

Figure 9:
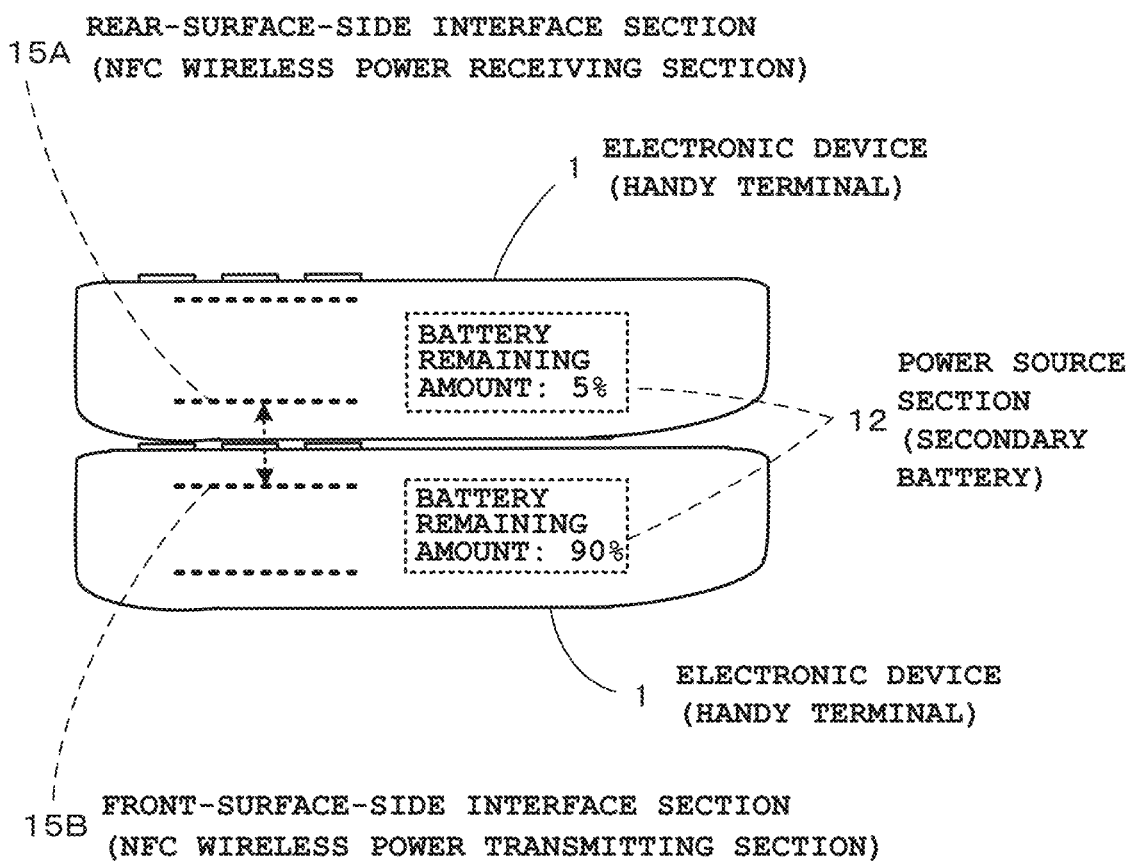
FIG. 9 is a diagram for describing a modification example of the embodiment, in which two electronic devices 1 are placed close to or on top of each other and one of them serves as a power supply source (power transmission side) for charging the other electronic device 1.

FIG. 9 is a diagram exemplarily showing this configuration where two electronic devices 1 are placed close to or on top of each other and one electronic device 1 serves as a power supply source (electric power transmission side) for charging the other electronic device 1.

In this configuration, two electronic devices 1 each receive the battery remaining amounts of the other by NFC communication with the front-surface-side interface section (NFC wireless power transmitting section) 15B of one electronic device 1 being placed close to or on top of the rear-surface-side interface section (NFC wireless power receiving section) 15A of the other electronic device 1, and designate an electronic device 1 whose battery remaining amount is higher as a power supply source (electric power transmission side) by comparing their battery remaining amounts.

In the example shown in the drawing, the battery remaining amount of an electronic device 1 at a lower position is 90% and the battery remaining amount of an electronic device 1 at an upper position is 5%. Therefore, the electronic device 1 at the lower position serves as a power supply source (electric power transmission side) for charging the electronic device 1 at the higher position.

Note that a configuration may be adopted in which a power supply source (electric power transmission side) is determined by a user operation of selecting and specifying an electric power transmission side or an electric power reception side.

Also, a configuration may be adopted in which the amount of electric power to be supplied from an electronic device on an electric power transmission side is fixed in advance at, for example, ⅓ or ¼ of an initial battery remaining amount. In this configuration, an electronic device 1 on an electric power transmission side stops discharging when a battery remaining amount reaches a predetermined amount.

Moreover, a configuration may be adopted in which a current operation mode is forcibly switched to the power-saving mode (suspend mode) when charging between the electronic devices 1 is performed.

Furthermore, a configuration may be adopted in which data communication is prohibited when charging between the electronic devices 1 is performed.

By the above-described configuration where charging is performed by two electronic devices 1 being placed close to or on top of each other, urgent charging can be performed in a situation where the charging device 2 and the power source device (AC adaptor) 6 cannot be used, whereby battery exhaustion on the spot can be prevented.

In the above-described embodiment, the present invention has been applied to a handy terminal as the electronic device 1. However, the present invention is not limited thereto, and can be applied to a portable telephone such as a smartphone, a PDA (Personal Digital Assistant), a digital camera, a music player, a tablet device, or the like.

Also, the "devices" and the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An electronic device having a secondary battery as a power source, comprising:
   a first interface arranged in one surface of the electronic device and including a first communicating section which performs data communication with a first external device by near field communication and a power receiving section which is capable of receiving electric power from the first external device without being in contact with the first external device and charging the secondary battery;

a second interface arranged in another surface of the electronic device and including a second communicating section which performs data communication with a second external device by near field communication and a power transmitting section which is capable of transmitting electric power received from the secondary battery to the second external device without being in contact with the second external device; and a control section which controls operations of the first interface and the second interface.

2. The electronic device according to claim 1, wherein the control section judges whether a power reception command received by the first communicating section of the first interface is a command directed to the electronic device and, when the power reception command is a command directed to the electronic device, controls to start charging to the secondary battery in accordance with the power reception command.

3. The electronic device according to claim 1, wherein the control section judges whether a power transmission command received by the first communicating section of the first interface is a command directed to the electronic device and, when the power transmission command is a command directed to the electronic device, controls to transmit the electric power received from the secondary battery to the second external device without being in contact with the second external device, in accordance with the power transmission command.

4. The electronic device according to claim 1, wherein the control section judges whether a command received by the first communicating section of the first interface is a command directed to the electronic device and, when the received command is not a command directed to the electronic device, controls to transmit the received command from the second communicating section of the second interface so as to relay the received command.

5. The electronic device according to claim 1, wherein the control section, when a command received by the first communicating section of the first interface is a command inquiring about number of connected devices, transmits the command from the second communicating section of the second interface, and then notifies an inquiring-source external device of the number of connected devices updated based on a response result received from an external device to which the command has been transmitted, from the first communicating section of the first interface.

6. The electronic device according to claim 1, further comprising:

a remaining amount detecting section which detects a remaining amount of the secondary battery, wherein the control section starts an operation of charging the secondary battery when the remaining amount of the secondary battery detected by the remaining amount detecting section is lower than a predetermined value, or starts an operation of transmitting the electric power received from the secondary battery to the second external device without being in contact with the second external device when the remaining amount of the secondary battery is equal to or higher than the predetermined value.

7. The electronic device according to claim 1, wherein the first interface uses a communication antenna of the first communicating section as an electromagnetic induction coil of the power receiving section, and wherein the second interface uses a communication antenna of the second communicating section as an electromagnetic induction coil of the power transmitting section.

8. The electronic device according to claim 1, wherein the first interface receives data transmitted from the first external device by using the data communication by the first communicating section, and wherein the second interface transmits the data received by the first interface to the second external device by using the data communication by the second communicating section.

9. The electronic device according to claim 1, further comprising:

an electric double-layer capacitor which serves as an auxiliary power source for the second battery, wherein the control section controls charging and discharging of the secondary battery and the electric double-layer capacitor.

10. The electronic device according to claim 1, further comprising:

a switching section which switches a current mode to a power-saving mode, wherein the control section controls the switching section to switch the current mode to the power-saving mode when controlling the second interface to transmit the electric power received from the secondary battery to the second external device.

11. A non-transitory computer-readable storage medium having stored thereon a program that is executable by a computer in an electronic device having a secondary battery as a power source and wherein arranged in one surface are (i) a first communicating section which performs data communication with a first external device by near field communication and (ii) a power receiving section which is capable of receiving electric power from the first external device without being in contact with the first external device and charging the secondary battery; and arranged in another surface are (i) a second communicating section which performs data communication with a second external device by near field communication and (ii) a power transmitting section which is capable of transmitting electric power received from the secondary battery to the second external device without being in contact with the second external device, the program being executable by the computer to perform functions comprising:

first processing for causing the first communicating section to perform data communication with the first external device by near field communication and causing the power receiving section to receive electric power from the first external device without being in contact with the first external device and charge the secondary battery;

second processing for causing the second communicating section to perform data communication with the second external device by near field communication and causing the power transmitting section to transmit electric power received from the secondary battery to the second external device without being in contact with the second external device; and control processing for controlling operations of the first processing and the second processing.

12. A portable terminal having a second battery as a power source, comprising:

a power receiving section which is arranged in one surface of a terminal body, and capable of performing data communication with a first external device by near field communication, receiving electric power from the first external device without being in contact with the first external device, and charging the secondary battery;

a power transmitting section which is arranged in another surface of the terminal body, and capable of performing data communication with a second external device by near field communication, and transmitting electric power received from the secondary battery to the second external device without being in contact with the second external device; and a control section which controls operations of the power receiving section and the power transmitting section.

* * * * *